Oct. 12, 1937.  G. W. VON HOFE ET AL  2,095,776
METHOD OF APPLYING ADHESIVE
Original Filed Sept. 5, 1935
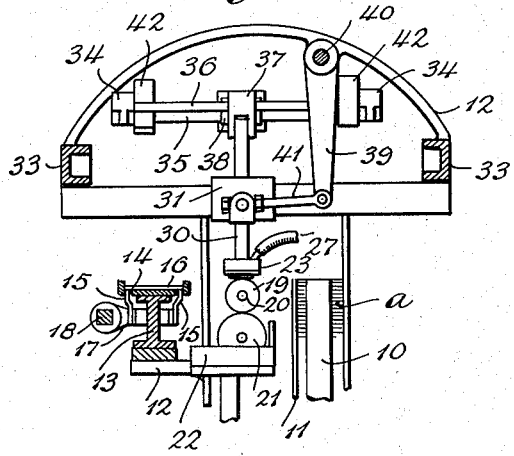
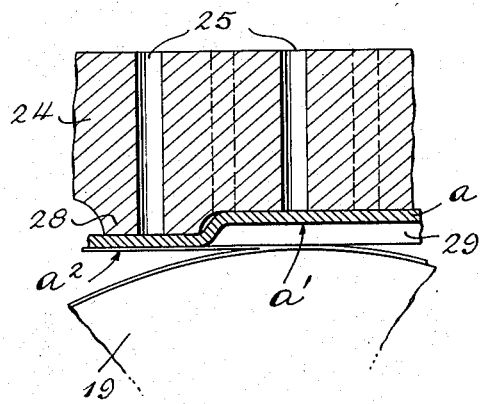
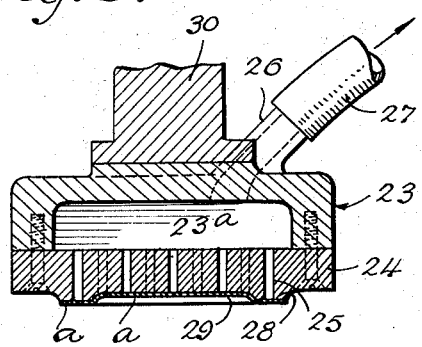
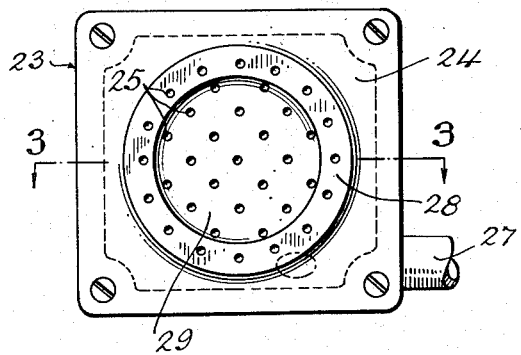
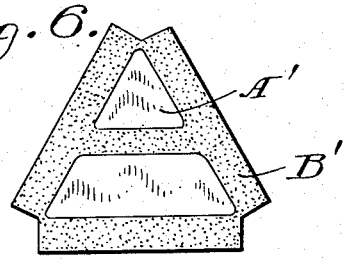
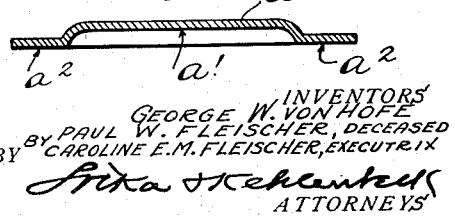
INVENTORS
GEORGE W. VON HOFE
PAUL W. FLEISCHER, DECEASED
BY CAROLINE E. M. FLEISCHER, EXECUTRIX
ATTORNEYS Patented Oct. 12, 1937

2,095,776

UNITED STATES PATENT OFFICE 2,095,776

METHOD OF APPLYING ADHESIVE

George W. von Hofe, Bound Brook, N. J., and Paul W. Fleischer, deceased, late of Weehawken, N. J., by Caroline E. M. Fleischer, executrix, Weehawken, N. J., assignors to New Jersey Machine Corporation, Hoboken, N. J., a corporation of New Jersey Original application September 5, 1935, Serial No. 39,236. Divided and this application August 5, 1936, Serial No. 94,374

5 Claims. (Cl. 91—68)

The invention relates to methods of applying adhesive to wrappers, labels, paper or similar flexible sheets adapted for use as covers, linings for boxes, cartons, containers or the like.

The invention contemplates the provision of a novel method whereby a surface of a wrapper, label, paper or similar flexible sheet may be coated with a predetermined pattern of adhesive or, in other words, whereby said adhesive may be efficiently and easily applied only to predetermined portions of said surface while other portions thereof remain uncoated with such adhesive in accordance with the purpose for which said material is to be used. Other more specific purposes will appear from the descriptions and the features of novelty will be pointed out in the claims.

This application is a division of another application filed jointly by me said George W. von Hofe and said Paul W. Fleischer, deceased, in the United States Patent Office on September 5, 1935, Serial No. 39,236.

In the accompanying drawing which illustrates an example of a novel machine forming the subject matter of the aforesaid earlier application, and designed to carry out the novel method, Fig. 1 shows a fragmentary view of said machine; Fig. 2 is an enlarged bottom view of a novel transfer head embodied in said machine; Fig. 3 is a sectional view on the line 3—3 of Fig. 2; Fig. 4 is a fragmentary view, on an enlarged scale, of the transfer head in engagement with the adhesive applying roll; Figs. 5 and 6 are face views illustrating examples of various adhesive patterns capable of being produced by the present method on said machine, and Fig. 7 is a sectional view of a sheet or its equivalent in distorted condition to receive an adhesive pattern.

In carrying out the novel method, the sheet $a$ or its equivalent is first distorted in any convenient manner to force a portion of said sheet $a$ or its equivalent out of the normal surface plane thereof for instance as shown in Fig. 7, in order to provide a recessed surface $a'$ and a relief surface $a^2$. The distortion of the sheet $a$ or its equivalent is accomplished in such a manner that the relief surface $a^2$ will have a configuration corresponding to the adhesive pattern to be produced, two examples of such pattern being illustrated in Figs. 5 and 6. When the aforesaid distortion of the sheet $a$ or its equivalent has been accomplished adhesive is applied to the relief surface $a^2$ in any convenient manner as by brushing or by passing an adhesive covered roller over said surface $a^2$. After the application of the adhesive to the surface $a^2$ has been completed, the sheet $a$ or its equivalent may be restored to its original flat condition so that the adhesive pattern resulting from the application of adhesive to the relief surface $a^2$ will appear on a surface of said sheet $a$ or its equivalent, which thereafter may be used for its intended purpose.

The aforesaid method is capable of being carried out in many different ways, and may be efficiently performed by machine, for instance as shown in the drawing and described in detail hereinafter.

In the example of the novel machine as illustrated in Fig. 1, a stack of sheets $a$ or their equivalent is supported to one side of the gumming device in a hopper indicated generally by the reference character 10, said hopper being suitably supported upon a cross tie 11 extending between and secured to two corresponding upright side frames, only one of which is shown and indicated as 12. Located on the other side of the gumming device is a conventional blank feeding means which as shown may consist of a track 13 supported on the frame 12, said track 13 being provided with slots 14 through which fingers 15 extend for engagement with the box body blanks or similar articles 16 which are adapted to be fed by said fingers 15 along the track 13 into position for receiving the sheets $a$ or their equivalent. The movement of the blanks 16 is effected by the action of the fingers 15 which in the illustrated example are attached to an arm 17 capable of horizontal movement on a bar 18 which in turn is mounted to rock about its longitudinal axis and accordingly imparts a rocking action to the arm 17. It is to be understood that the horizontal and rocking movements of the arm 17 may be accomplished by any conventional cam mechanism and associated elements; as this cam mechanism and associated elements per se form no part of the invention, it has not been deemed necessary to illustrate the same.

The previously mentioned gumming device, which is located between the blank feeding means just described and the hopper 10, may be of any suitable construction and as shown, may consist of a gum applying roll 19 fixed upon a shaft 20 journaled in the uprights of the machine. The shaft 20 may be driven by any conventional means which will maintain the peripheral velocity of the roll 19 in proper relation to the other parts of the machine. The periphery of the adhesive applying roll 19 in the illustrated example is in adhesive receiving relation to the adhesive transferring roll 21 which dips into a supply of adhesive contained in a bath or tray 22 suitably mounted in the machine.

The sheets *a* or their equivalent are transferred in individual succession from the stack or hopper 10 by means of a suction feed head 23 including a chamber 23a and having a plate 24 removably attached to the lower portion thereof. The plate 24 is provided with a series of holes 25 for establishing communication between the chamber 23a and the outside air. On the upper surface of the head 23 is a connection 26 to which is attached a hose 27 leading to a convenient source of suction not shown. The lower face of the plate 24 has a relief surface 28 and a recessed surface 29, the relief surface 28 corresponding in configuration and form to the specific adhesive pattern desired to be applied to a sheet *a* or its equivalent when held by means of air pressure against the surfaces 28 and 29 as will be explained more fully hereinafter.

The head 23 with the attached plate 24 is carried on the lower end of a post 30 slidably mounted within a carrier 31 which itself is slidably mounted upon a rail 32 located above and transversely to the gumming device as exemplified by the gum applying roll 19 and its cooperating elements, said rail 32 being secured at its ends to a pair of cross braces 33 mounted in any convenient manner upon the uprights 12. The suction head 23 is moved vertically by means of levers 34 fixed at one end upon a shaft 35, said levers 34 at their other ends carrying a shaft 36 on which a connecting link 37 is adapted to slide, said connecting link 37 being loosely connected to the upper end of the post 30. The shaft 36 is oscillated in predetermined timed relationship with the movements of the fingers 15 and bar 18 by means of a cam controlled lever 38 also fixed to the shaft 35, it being understood that the controlling mechanism for operating the lever 38 may be of any conventional design.

Movement of the suction head 23 transversely to the track 13 and the gum applying roll 19 for bringing a sheet *a* or its equivalent into position above the blank 16, is effected by means of an oscillating lever 39 fixed at its upper end upon a shaft 40 and connected at its lower end by means of a connecting link 41 with the carrier 31; the shaft 40 is journaled in suitable bearings at the top of the uprights 12 and is connected with suitable means to effect oscillation of the shaft 40 and lever 39 in properly timed relation to the other parts of the machine.

The operation of the parts described for carrying out the novel method and for coating a surface of flexible sheets with predetermined patterns of adhesive is as follows:

During the time the arm 17 and fingers 15 are moving to place the blank 16 in position for receiving a sheet *a* or its equivalent, the suction head 23 has been moved from a position in contact with the uppermost sheet *a* in the hopper 10 to a position immediately above the blank 16 which is in receiving position. It is to be understood that the hopper 10 is provided with an elevating device of any suitable type for maintaining the uppermost sheet of the stack in proper operative relation to the suction head 23. The movement of the suction head 23 is a combined vertical and horizontal movement, the head first being moved upwardly by the action of the parts 35, 34, 36, 37, and 30, and any conventional co-operating means for imparting movement thereto, to raise the uppermost sheet *a* from the top of the stack, such sheet *a* being caused to adhere to the lower face of the suction head plate 24 by means of the suction induced in the chamber 23a and holes 25 of said head through the hose connection 27, which, as previously stated, leads to any suitable source of suction, it being understood that the application and discontinuance of the suction is controlled by a properly timed valving means of any suitable form. As the sheet *a* or its equivalent is subjected to the effect of the suction whereby said sheet *a* is caused to adhere to the lower face of the plate 24, the sheet will be drawn and held against the relief surface 28 and the recessed surface 29 of said plate 24 as illustrated in Figs. 3 and 4 of the drawing. As a result of this, said sheet *a* or its equivalent will be distorted, or in other words the portion thereof which engages the recessed surface 29 will be forced out of the normal surface plane of said sheet *a* or its equivalent, which in the illustrated example, means upwardly out of the plane of those parts of said sheet *a* or its equivalent held in engagement with the relief surface 28 of the plate 24. Inasmuch as the form of the relief surface 28 always corresponds to the shape of the adhesive pattern to be produced, the sheet *a* or its equivalent will therefore be distorted in accordance with the particular adhesive pattern for which the plate 24 being used is designed. After the head 23 has been moved upwardly with the distorted sheet *a* or its equivalent adhering thereto, said head is caused to travel horizontally to carry the distorted sheet *a* across the upper surface of the glue applying roll 19 as shown in Fig. 4, which roll 19 applies a coat of adhesive to the underside of the sheet *a* or its equivalent over the desired areas as determined by the relief portion 28 of the plate 24; in its passage across the glue applying roll 19, those parts of the sheet *a* or its equivalent which are held in contact with the recessed surface 29 will not contact with said roll 19 and accordingly will receive no adhesive therefrom. After the gum has been applied as described, the suction head 23 carries the gummed sheet or its equivalent to a position immediately above the blank 16. It will be understood that the horizontal movement is imparted to the suction head 23 by causing the carrier 31 to be moved along the rail 32 through the intermediary of the lever 39, link 41, shaft 40 and a conventional cam or equivalent means with the necessary connections. The blank 16 is supported on the rail 13 so that when the suction head 23 with the gummed sheet *a* or its equivalent is brought down into contact with said blank 16 the gummed areas of said sheet *a* or its equivalent will be positioned in proper registering relation with the blank 16. It will be understood that the suction in the suction head 23 is relieved in proper synchronism with the initial application of the gummed sheet *a* or its equivalent to the blank 16 and that said application of said sheet to said blank may be completed in any customary manner; it further will be understood when the suction or equivalent distorting force is relieved that the sheet or its equivalent immediately returns to its normal condition.

After the sheet *a* or its equivalent with the adhesive pattern thereon has been applied to the blank 16, which as stated above may be accomplished in any conventional manner, the suction head 23 moves upwardly and then laterally in a return direction at such an elevation that the lower surface of the relief portion 28 will not engage the glue applying roll 19. The suction head 23 will continue to move laterally until it returns into operative relation with the sheets or their equivalent in the hopper 10 from which the suction head 23 will remove the next successive terminal sheet a or its equivalent after which the operations described above will be repeated.

From the above description, the manner in which an adhesive pattern of predetermined form is automatically obtained will be evident, the plate 24, as shown in Fig. 2, being provided with a circular relief surface 28 to produce a circular adhesive pattern, while two of the many possible variations of adhesive patterns capable of being applied and produced by the novel method and machine are disclosed in Figs. 5 and 6. In Fig. 5, A represents a box wrapper to which has been applied adhesive according to the pattern B, while Fig. 6 shows a wrap or label A' which has the adhesive pattern B' applied thereto. It will be obvious that the adhesive patterns B and B' are produced by providing plates 24 having relief surfaces 28 which respectively correspond in shape to the patterns B and B', and then performing the operative steps set forth hereinabove. It is to be noted that by the novel method and machine adhesive patterns having curved, parallel, or non-parallel edges can be easily made by merely changing the configuration of the relief surface 28 of the plate 24, and then selecting the proper plate for attachment to the suction feed head 23.

It is to be distinctly understood that the term "sheet" as used in the specification is intended to cover and include wrappers, labels, and paper or similar flexible sheets designed for use as covers or linings for boxes, cartons, containers and the like, as well as any other elements on which it may be desirable to produce predetermined adhesive patterns.

While the apparatus above described represents a satisfactory and practical construction which has proven successful in commercial operation, it will be understood that the principles of the invention are not limited to the specific constructional details of the various parts which perform the several steps of the method herein disclosed, but that many changes, variations and modifications of the constructional details of such parts may be resorted to without departing from the spirit and principles of the invention.

We claim:

1. The method of applying an adhesive pattern to a sheet or its equivalent having a plane surface which comprises forming on said sheet a temporary relief surface corresponding to the adhesive pattern to be produced by subjecting said sheet to a distorting force whereby said sheet is distorted in a manner permitting said sheet to readily return to its plane surface form, applying an adhesive exclusively to said relief surface while said sheet is subjected to said distorting force, and permitting said sheet to return to its normal condition in which it has a plane surface.

2. The method of applying adhesive patterns to a sheet or its equivalent having a plane surface which comprises forming on said sheet a temporary relief surface corresponding to the adhesive pattern to be produced by subjecting said sheet to a distorting fluid pressure whereby said sheet is distorted in a manner permitting said sheet to readily return to its plane surface form, applying an adhesive exclusively to said relief surface while said sheet is subjected to said distorting fluid pressure, and permitting said sheet to return to its normal condition in which it has a plane surface.

3. The method of applying an adhesive pattern to a sheet or its equivalent having a plane surface which comprises forming on said sheet a temporary relief surface corresponding to the adhesive pattern to be produced by subjecting said sheet to a distorting force whereby said sheet is distorted in a manner permitting said sheet to readily return to its plane surface form, contacting the relief surface by rolling engagement with an adhesive coated surface to apply adhesive exclusively to said relief surface while said sheet is subjected to said distorting force, and permitting said sheet to return to its normal condition in which it has a plane surface.

4. The method of applying an adhesive pattern to a sheet or its equivalent having a plane surface which comprises supporting the sheet on a surface provided with the desired pattern in relief, temporarily distorting predetermined portions of the sheet out of its normal plane surface on said surface to reproduce the desired pattern in relief on said sheet, maintaining said sheet or its equivalent in its distorted condition, in the distorted condition of said sheet applying an adhesive exclusively to the relief surface of the distorted sheet or its equivalent, and permitting said sheet to return to its normal condition in which it has a plane surface.

5. The method of applying a predetermined adhesive pattern to a sheet or its equivalent comprising supporting the sheet with predetermined portions thereof temporarily distorted out of the normal plane of said sheet to reproduce the desired pattern in relief thereon, maintaining said sheet or its equivalent in its distorted condition, applying adhesive exclusively to those portions of the distorted sheet which reproduce said pattern by progressive line contact with an adhesive coated surface, and permitting said sheet to return to its normal condition in which it has a plane surface.

GEORGE W. von HOFE.
CAROLINE E. M. FLEISCHER,
*Executrix of the Estate of Paul W. Fleischer, Deceased.*